Jan. 8, 1935.　　　　I. B. KNUTSON　　　　1,987,342
ACCOUNTING MACHINE FOR PUNCHING TOTALS
Filed Dec. 2, 1932　　　3 Sheets-Sheet 1

INVENTOR
Irving B. Knutson
BY
W. M. Wilson
ATTORNEY

Jan. 8, 1935.  I. B. KNUTSON  1,987,342
ACCOUNTING MACHINE FOR PUNCHING TOTALS
Filed Dec. 2, 1932   3 Sheets-Sheet 2
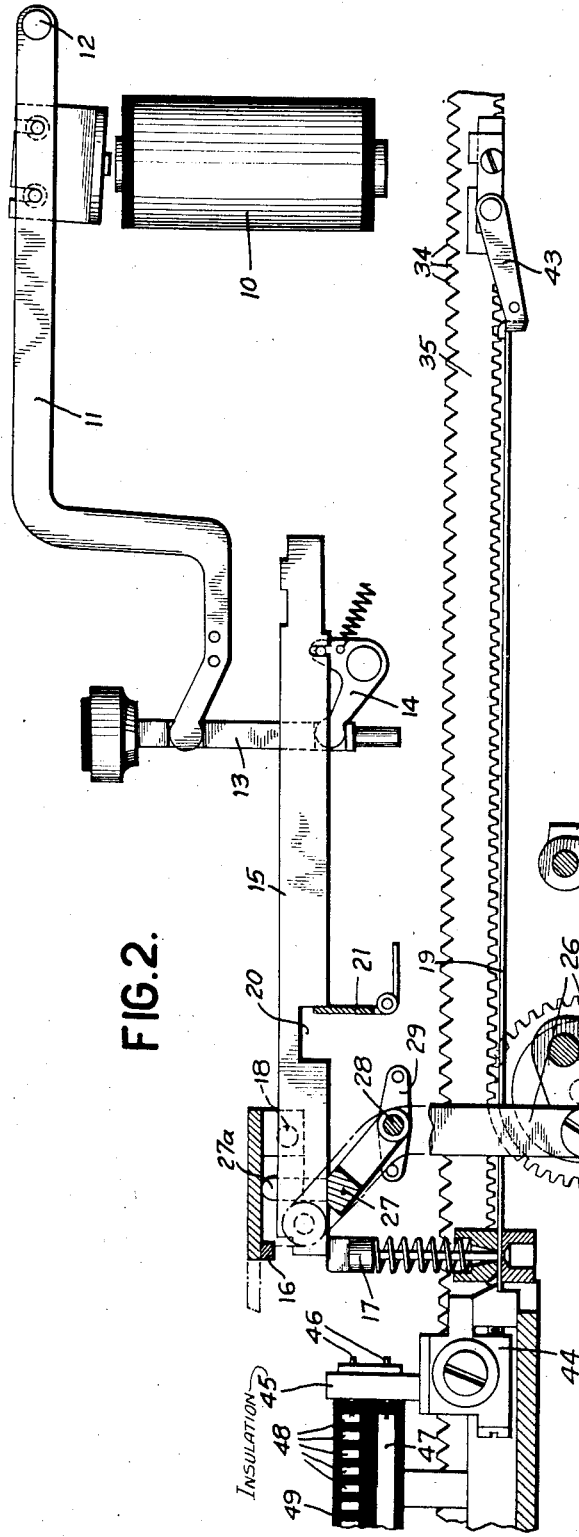
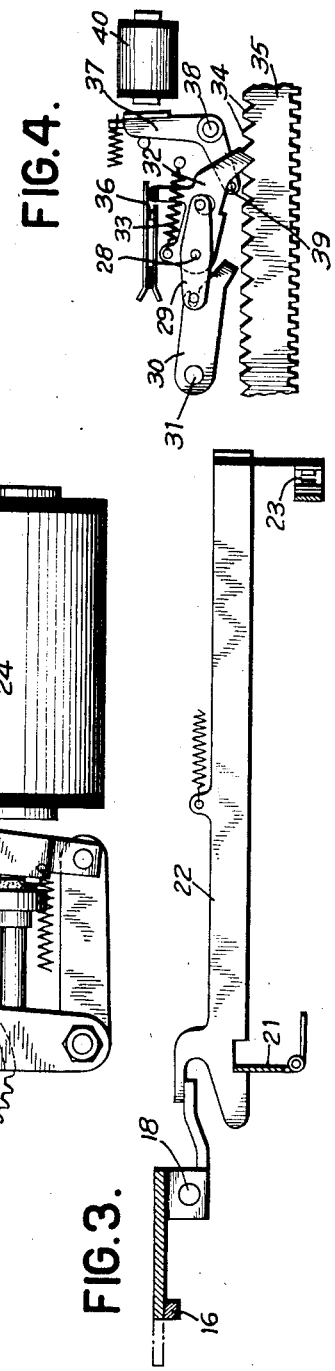
INVENTOR
Irving B. Knutson
BY
W. M. Wilson
ATTORNEY Jan. 8, 1935.   I. B. KNUTSON   1,987,342
ACCOUNTING MACHINE FOR PUNCHING TOTALS
Filed Dec. 2, 1932   3 Sheets-Sheet 3

INVENTOR
Irving B. Knutson
BY
W. M. Wilson
ATTORNEY

Patented Jan. 8, 1935

1,987,342

UNITED STATES PATENT OFFICE 1,987,342

ACCOUNTING MACHINE FOR PUNCHING TOTALS

Irving B. Knutson, Chicago, Ill., assignor, by mesne assignments, to International Business Machines Corporation, New York, N. Y., a corporation of New York Application December 2, 1932, Serial No. 645,336

5 Claims. (Cl. 235—92)

This invention relates to accounting machines and more specifically to so-called summary punching tabulators in which provision is made for automatically perforating a record card in accordance with data standing on the accumulators of the tabulating machine. In certain types of tabulating machines provision is made for separately accumulating debit items and credit items and further provision is also made for accumulating a balance of these items which might either be a debit balance or a credit balance. Two accumulators are usually assigned to the accumulation of balances, one of which will always indicate a true number and the other the complement of that number.

It is one of the objects of the present invention to provide means for determining which of the balance accumulators contains the true balance and to control the operation of punching mechanism to perforate a pre-selected field of a record card in accordance with such true balance. The punching device employed in the present invention is of the step-by-step or column-by-column type in which the several columns of the record card are advanced successively past a single line of punches. With such an arrangement, two fields of the record card, separately set aside to receive debit and credit balances respectively, will pass in succession beneath the line of punches and it is a further object of the invention to automatically pass the field associated with the accumulator having the negative balance past the line of punches without perforating such field and to automatically punch the true number in the other field under control of the accumulator containing the true balance.

Further provision is made whereby the field associated with the accumulator having the negative balance may be automatically punched in a predetermined index point position in each column as for instance in the 0 index point position.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 2 is a section of the essential operating mechanism of the punch;

Fig. 3 is a detail of the punch magnet operating contact mechanism;

Fig. 4 is a detail of the punch carriage escapement mechanism;

Figure 1:
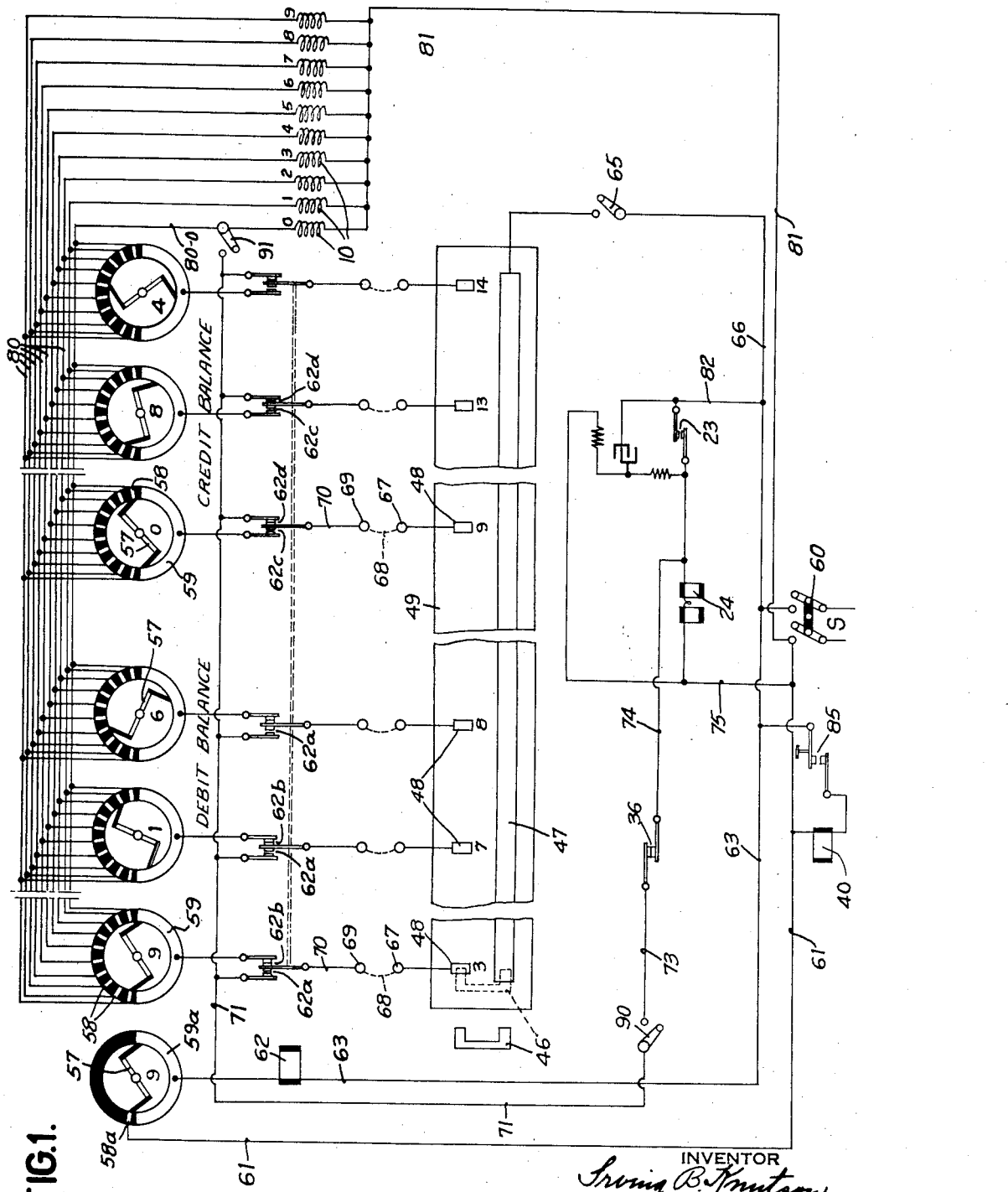
Fig. 1 is a wiring diagram of the electric circuits of the device.

The punching machine, which will first be described, is generally of the form shown in the Lee and Phillips Patent No. 1,772,186, granted August 5, 1930, and the description thereof will be limited to the features essential to an understanding of the present invention.

Referring to Fig. 2, punch selecting magnets 10 are provided, there being one for each index point position of the record card. Energization of magnet 10 will attract its armature to rock an arm 11 in a counterclockwise direction about its pivot 12, thus moving key 13 downwardly to rock a bell crank 14 which has connection with an interposer 15 suitably mounted for horizontal reciprocation. The forward or left end of interposer 15 is suitably guided between an operating bar 16 and the upper end of a punch 17.

Forward movement of the interposer will position its widest portion between bar 16 and punch 17 so that subsequent counterclockwise rocking of bar 16 about pivot 18 will move the interposer and punch downwardly to perforate the record card 19.

A notch 20 in the interposer 15 cooperates with a bar 21 to rock the same in a counterclockwise direction when the interposed is moved toward the left. Rocking of bar 21 in such a manner will draw a hook-shaped member 22 (see Fig. 3) toward the left to close a pair of contacts 23. As will be explained in connection with the circuit diagram, contacts 23 complete a circuit through the punch magnet 24 causing it to attract its armature 25 and, through linkage generally designated 26, draw downwardly on the bar 16 to cause depression of the selected punch 17. Depression of key 13 may, of course, be effected independently of the operation of the magnet 10 for the purpose of manually controlling punching operations.

Disposed beneath the interposers 15 is a bar 27 which is carried by rod 28 upon one end of which is secured an arm 29 (Fig. 4) for operating the escapement mechanism, this escapement mechanism comprising a pawl 30 pivoted at 31 to the frame of the machine and a step pawl 32 loosely pivoted on rod 28 and normally urged by a spring 33 into engagement with the teeth 34 on the upper edge of the carriage rack 35. Rocking of rod 28 in a counterclockwise direction under action of an interposer 15 will lower pawl 30 into engagement with a tooth 34 to hold the rack 35 in position while punching is being effected. This action, at the same time, raises pawl 32 out of engagement with teeth 34 and by virtue of the loose connection of pawl 32 upon rod 28 the pawl 32 will move slightly toward the right in readiness to intercept the next tooth 34 when the rod 28 is returned to its original position. A pair of contacts 36 is provided which is so associated with the pawl 32 that the contacts are open when the pawl is in its raised position and closed when it is in engagement with a notch or tooth 34.

A bell crank 37 pivoted at 38 to the frame of the machine carries a pin 39 underlying pawl 32. Energization of a magnet 40 will rock the bell crank in a clockwise direction whereby pin 39 will raise pawl 32 out of notch 34 to release the bar 35 from control of the escapement mechanism, thus permitting it to move rapidly toward the left with a continuous motion.

Referring again to Fig. 2, the rack 35 is suitably mounted for horizontal movement in the frame of the machine and may be manually moved toward the right to the position shown wherein a record card 19 is placed in position with the first column thereof in line with the punches 17. Gear teeth cut on the underside of the rack cooperate with suitable gearing 41 which is connected to the usual spring barrel 42 which tends to move the rack toward the left and which effects such movement under control of the escapement mechanism just described. An arm 43 carried by the rack 35 is provided for cooperation with the card 19 to move it column by column past the punches 17. The above briefly describes the mechanism necessary to an understanding of the operation of the punch. For further details of construction, reference may be had to the Lee and Phillips patent referred to.

Escapement bar 35 is provided with the usual forward card guide 44 to which, for the purposes of the present invention, is secured an insulating member 45 carrying a pair of electrically connected brushes 46, the lower of which traverses a strip of conducting material 47 and the upper brush traverses a plurality of contact segments 48. The strip 47 and segments 48 are embedded in a bar 49 which is secured to the frame of the machine. The spacing of segments 48 corresponds to the spacing of the column of the record card and the relationship of the parts is such that the punches 17 are in position to perforate the first column of the record card when brushes 46 connect the first segment 48 with the strip 47 and positioning of the punches 17 over any other column of the record card will be accompanied by bridging of the corresponding segment 48 and common strip 47 by the brushes 46.

The accumulators from which totals or balances are to be punched are of the well-known type shown and described in Patent No. 1,307,740, granted to C. D. Lake, June 24, 1919 and only so much thereof will be here explained as is necessary to the understanding of the invention.

Figures 5, 6:
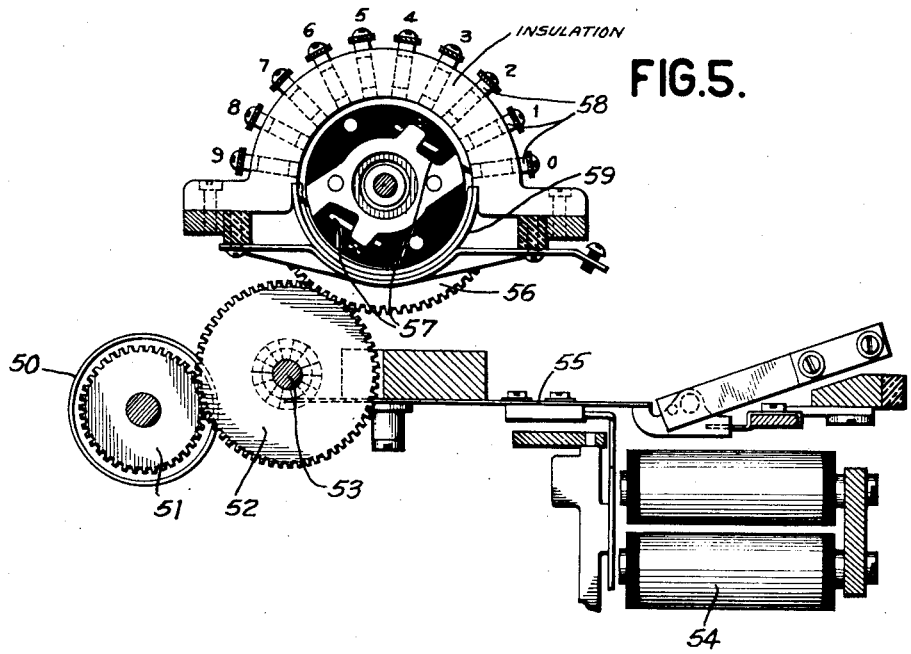
Fig. 5 is a view showing part of the operating mechanism of the accumulator.
Fig. 6 is a fragment of a record card in which the data on the accumulator are to be perforated.

Referring to Fig. 5, the usual indicating wheel 50 carries a gear 51 which is driven by a gear 52 on the clutch shaft 53. The usual adding magnet 54 upon energization will trip a clutch lever 55 at a differential time depending upon the location of the controlling perforation in the record card. This will cause gear 52 and consequently indicator 50 to move a distance proportional to the value of the perforation sensed. This in general explains the manner in which data are entered into the denominational orders of the accumulator. For further details of construction and operation, reference may be had to the patent referred to. For the purposes of the present invention, gear 52 is also utilized to drive a gear 56 upon which is mounted and insulated therefrom a pair of electrically connected brushes 57 which are adapted to traverse a plurality of insulated commutator segments 58 and a common conducting strip 59. The segments 58 are arranged in an arc of a circle and represent the several digits, the gear arrangement being such that one of the brushes 57 will always be in contact with the segment corresponding to the value represented upon the indicating wheel 50. Thus, if a "5" has been entered into the accumulating wheel, one of the brushes 57 will be in contact with the "5" segment 58 and the other brush will be in contact with strip 59, the latter being thus electrically connected to the "5" segment 58. It will be understood that a similar brush and contact arrangement is provided for each denominational order of the accumulators which are to control the operation of the punch and that all operate in the same manner.

In order to better understand the manner in which the present invention is utilized in connection with tabulating equipment, a brief general statement will be made explaining the general cyclic operation of a tabulating machine of the type in which the present invention finds especial utility.

Tabulating machines are generally provided with an automatic control mechanism which changes the operation of the machine in accordance with the groups of cards tabulated. Control by this mechanism is exercised from a selected group of index point positions in adjacent card columns. As long as each consecutively fed card has the same group number as the preceding card, the machine will continue to accumulate the items on the cards and may also list them. Where balances are desired, two balance accumulators are provided into one of which all debit items are entered in their true value and the complements of all credit items. Into the other accumulator, all credit items are entered in their true value together with the complements of all debit items. When a group number change is sensed by the machine, the automatic control mechanism will operate in either of two ways, depending upon the preliminary setting of certain control switches. According to one mode of operation, the automatic control mechanism, upon a group change, may initiate a total printing and resetting operation. According to another mode of operation, the machine automatically stops after a group change and the total printing and resetting operations are initiated manually. The purpose of the present invention is to automatically punch on a record card the readings of one of the two balance accumulators after they have come to rest. This punching may be either in addition to or in lieu of the total printing operation of the machine. It will thus be understood that punching of balances from one of the balance accumulators will be effected while the tabulating machine proper is at rest.

Following the punching operation, the accumulators may be reset and further tabulating operations effected under control of another group of record cards.

The complete operation of the device may best be understood by reference to a particular problem and in connection with the wiring diagram of Fig. 1. In this figure, the commutator devices of three orders of the credit balance accumulator are indicated and four orders of the debit balance accumulator, the highest denominational order of the latter being provided with a single commutator segment 58a in the "9" position. When the brush 57 of this highest order is at "9", a circuit may be traced from source S when switch 60 is closed, through wire 61, segment 58a, brush 57, common 59a, relay coil 62, wire 63, back to source S. Relay coil 62 is adapted to operate a plurality of contacts 62a, 62b, 62c, and 62d. Considering that a group of cards has been analyzed by the tabulator and data therefrom entered into the debit and credit balance accumulators and that there resulted a credit balance of 84; with the tabulator at rest upon completion of the tabulation of this group, the several brushes 57 will be in the position shown in Fig. 1, indicating the positive value 84 on the credit balance accumulator and the complement thereof, 9—916, on the debit balance accumulator. The consequent energization of coil 62 will have shifted the position of the various relay contacts so that contacts 62a and 62c will be closed and contacts 62b and 62d will be open. This will be the condition of the parts at the time punching is to take place. The operator will have placed a record card 19, such as is shown in Fig. 6, in position in the punch with the third column in the debit balance field beneath the line of punches 17. It will be understood that the brush 46 will at this time be in contact with the segment 48 in the corresponding columnar position.

The operator will thereupon close a pair of contacts 65 to complete a circuit from source S, through wire 66, contacts 65, common strip 47, brush 46, segment 48, plug socket 67, suitable plug connection 68, to a plug socket 69 which is connected by a wire 70 to the central blade of contacts 62a, 62b. Since contacts 62a are closed at this time, the circuit will continue to a wire 71, switch 90, contacts 36, wire 74, punch magnet 24, wire 75, to other side of source S. It will thus be seen that punch magnet 24 is energized independently of the selection of a punch and forward movement of a corresponding interposer 15.

Referring now to Fig. 2, it will be seen that such operation will idly depress punch bar 16 which in turn will move an extension 27a on bar 27 downwardly to rock rod 28 causing the escapement mechanism to advance the card carriage one step and the brush 46 will advance therewith to the next segment 48. In this position a similar circuit will again be completed through the magnet 24 to advance the card to the next following column since in this column contact 62a is also closed. It will thus be apparent that all of the columns of the debit balance field will be successively advanced beneath the line of punches 17 without being perforated thereby.

When the brush 46 contacts with the segment 48 in the highest denominational order of the credit balance field, a circuit will be completed from source S, wire 66, switch 65, common bar 47, brush 46, contact segment 48, plug sockets and plug connection 67, 68, 69, wire 70, contact 62c, which is now closed, common 59, brush 57, to the "0" segment 58 in this order to the lowermost wire 80—0 of a group of wires generally designated 80, thence through "0" punch selecting magnet 10, wire 81, to the other side of source S. Energization of magnet 10 will advance its interposer 15 in the "0" position and such advance will cause closure of contacts 23 to cause energization of punch magnet 24 through a circuit traced from source S, wire 75, punch magnet 24, contacts 23, wire 82, to other side of source S. Punching will thus be effected in the zero position of the ninth column of the record card and the card will escape to the next column.

Each of the several columns of the credit balance field of the card 19 will be perforated in succession in the same manner, an "8" being punched in the tens column and a "4" in the units column. After the units order position has been perforated the card will be escaped to the next position and the punch may come to rest. The operator may then open switch 65 and proceed to enter other data on the card by manual operation of the keys 13. After all perforating operations have been completed, closure of contacts 85 will energize magnet 40 to release the escapement mechanism and the card and carriage will move toward their extreme left hand position from which the card may be removed by the operator. The tabulating machine may then be again operated to accumulate data under control of another group of record cards and upon completion of such tabulating operations another summary card may be prepared in the manner explained above.

If the debit balance of a group of record cards is a true number, brush 57 of the highest order of the debit balance counter will not be in contact with the segment 58a so that when the operator closes switch 65 preparatory to initiating punching operations, relay magnet 62 will be in its normal deenergized condition and contacts 62a, 62b, 62c, and 62d will be in the positions shown in Fig. 1 and the first punch selecting circuit completed upon closure of switch 65 will be traceable through contact 62b of the first order of the debit balance commutator device to select the punch magnet 10 corresponding to the debit value represented in this order. Circuits will be completed through the several other orders in succession resulting in the perforation of the debit balance field of the card 19 in accordance with the amount in this counter. Since the contacts 62c are now open, the credit balance counter commutator devices are disconnected from the punch selecting circuits and a circuit will be completed through the punch magnet 24 to operate the escapement mechanism as each column of the record card is presented to the punches.

These circuits may be traced as follows: from source S, wire 66, switch 65, common strip 47, brush 46, segment 48, plug socket 67, connection 68, socket 69, wire 70, closed contact 62d, wire 71, switch 90, wire 73, contact 36, wire 74, punch magnet 24, wire 75, to other side of source S.

The device will thus discover which of the two accumulators contains the true balance and if such balance be a debit balance, such balance will be automatically perforated in the debit balance field of the record card and the credit balance field will be automatically skipped. If the true balance is found to be a credit quantity, the debit balance field of the record card will be automatically skipped and perforations automatically effected in the credit balance field representative of the amount standing on the credit balance accumulator.

In some tabulating systems it is the practice to perforate zeros in all columns of fields in which no significant entry is to be made. The present invention is therefore arranged to permit the automatic perforation of zeros in each column of the debit balance field when the true balance is perforated in the credit balance field. For this operation it is simply necessary to open switch 90 and close switch 91. Inspection of the circuit diagram will show that the several circuits through contacts 62a and 62d will continue through switch 91 to "0" selecting magnet 10 which upon energization will select the "0" punch for operation and will also close contact 23 to energize punch magnet 24. The circuit in detail is as follows: from source S, wire 66, switch 65, common strip 47, brush 46, a segment 48, a plug socket 67, connection 68, socket 69, wire 70, closed contacts 62a or 62d, wire 71, switch 91, zero magnet 10, wire 81, to source S.

While the invention has been shown in simplified form and only the necessary controls between the accumulator and the punch shown and the punching operation explained as being initiated by manual closure of switch 65, it will be understood that in practice the tabulating machine proper may be adapted to automatically close this circuit upon completion of the tabulation of a group of cards so that the operation of punching the total or summary card 19 may automatically and immediately follow up on the completion of tabulating operations.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In combination, a pair of accumulators, a corresponding pair of record card fields, punches, means for advancing said fields past said punches, means controlled by said accumulators for actuating said punches to perforate said fields in accordance with the data standing on the corresponding accumulators, and means controlled by one of said accumulators for causing one of said fields to pass said punches without being perforated.

2. In combination, a pair of accumulators, a corresponding pair of multi-columnar record card fields, punches, means for advancing said fields past said punches, means controlled by said accumulators for actuating said punches to perforate said fields in accordance with the data standing on the corresponding accumulators, means controlled by one of said accumulators for suppressing accumulator controlled punching operations in one of said fields and means for automatically perforating each column of said last named field in the same index point position.

3. In an accounting machine, a pair of accumulators, either of which is adapted to receive a true number and the other, the complement of said true number, a line of punches, means for advancing a pair of fields of a record card past said punches, said fields corresponding to said accumulators, means for determining which accumulator has a true number standing thereon and means controlled by said accumulator for controlling the operation of said punches to punch the true number in the corresponding field as it is advanced past said line of punches.

4. In combination, a pair of accumulators one of which is adapted to receive a true number and the other, the complement of said true number, a punching mechanism adapted to perforate a record card having a pair of fields corresponding to the pair of accumulators, means for sensing the accumulators to determine which shows the complementary number and means controlled thereby for presenting one of said fields to said punching mechanism to receive perforations under control of the accumulator having the true number.

5. In combination, a pair of accumulators one of which is adapted to receive a true number and the other, the complement of said true number, a punching mechanism adapted to perforate a record card having a pair of fields corresponding to the pair of accumulators, means for sensing the accumulators to determine which shows the complementary number, means controlled thereby for selecting one of said fields to receive perforations under control of the accumulator having the true number and further means for automatically perforating the other field in accordance with a predetermined designation.

IRVING B. KNUTSON.